(12) United States Patent
Shrader

(10) Patent No.: US 6,870,551 B1
(45) Date of Patent: Mar. 22, 2005

(54) METHOD AND APPARATUS FOR DISPLAYING FULL AND SELECTED DYNAMIC DATA IN A DATA PROCESSING SYSTEM

(75) Inventor: Theodore Jack London Shrader, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/239,248

(22) Filed: Jan. 28, 1999

(51) Int. Cl.⁷ ............................................. G09G 5/00
(52) U.S. Cl. ......................................... 345/684; 345/685
(58) Field of Search ................................. 345/123, 346, 345/326, 684, 685, 688, 784, 785, 786, 787, 158, 173, 204, 790, 2.2, 2.3, 169, 901, 804, 636, 56, 57, 58, 59, 60; 705/37; 701/213; 707/512, 516, 529, 700, 104.1, 3, 501.1; 702/2

(56) References Cited

U.S. PATENT DOCUMENTS 5,270,922 A * 12/1993 Higgins .................... 705/37
5,530,942 A * 6/1996 Tzou et al. ................ 707/512
5,689,651 A * 11/1997 Lozman .................... 705/37
5,699,244 A * 12/1997 Clark et al. ................. 702/2
5,774,109 A * 6/1998 Winksy et al. ............ 345/689
5,809,483 A * 9/1998 Broka et al. ............... 705/37

* cited by examiner

Primary Examiner—Matthew Luu
(74) Attorney, Agent, or Firm—Duke W. Yee; Jeffrey S. LaBaw; Wayne P. Bailey

(57) ABSTRACT

A method and apparatus in a data processing system for displaying data. A stream of data is received. The stream of data is displayed in a scrolling display field in which data is scrolling. Responsive to a user input selecting a portion of the data in the stream of data being displayed, scrolling of the data is halted in the scrolling display field. A stationary display field is created. Scrolling of the data on the scrolling display field is restored. Responsive to changes in the selected data in the stream of data being received, the scrolling display field and the stationary display field are updated.

28 Claims, 7 Drawing Sheets

METHOD AND APPARATUS FOR DISPLAYING FULL AND SELECTED DYNAMIC DATA IN A DATA PROCESSING SYSTEM

BACKGROUND OF THE INVENTION

1. Technical Field

The present invention relates generally to an improved data processing system and in particular to a method and apparatus for displaying data within a data processing system. Still more particularly, the present invention relates to a method and apparatus for displaying and manipulating dynamic data in a data processing system.

2. Description of Related Art

Internet, also referred to as an "internetwork", is a set of computer networks, possibly dissimilar, joined together by means of gateways that handle data transfer and the conversion of messages from the sending network to the protocols used by the receiving network (with packets if necessary). When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). Information is formatted for presentation to a user by a standard page description language, the Hypertext Markup Language (HTML). In addition to basic presentation formatting, HTML allows developers to specify "links" to other Web resources identified by a Uniform Resource Locator (URL). A URL is a special syntax identifier defining a communications path to specific information. Each logical block of information accessible to a client, called a "page" or a "Web page", is identified by a URL. The URL provides a universal, consistent method for finding and accessing this information, not necessarily for the user, but mostly for the user's Web "browser". A browser is a program capable of submitting a request for information identified by a URL at the client machine. Retrieval of information on the Web is generally accomplished with an HTML-compatible browser. The Internet also is widely used to transfer applications to users using browsers. With respect to commerce on the Web, individual consumers and business use the Web to purchase various goods and services. In offering goods and services, some companies offer goods and services solely on the Web while others use the Web to extend their reach.

A number of users use the Internet to obtain data either on a periodic or continuous manner. For example, stockbrokers and investors will receive a stream of data containing quotes for various stocks. This data stream is received and displayed on a display in the form of a "ticker tape" that scrolls across the screen. The scrolling information is such that the information received in the data stream is displayed a portion at a time with the portion of the information moving or scrolling across the screen. The information in the data stream is dynamic because the data is updated to contain changes in the data over time. For example, data for a particular stock quote received in the data stream will be received again with any changes for the particular stock quote.

Often times, a user will desire to continue to see a selected portion of the information rather than have the information scroll off the screen and wait for it to appear at a later time. Such a display is not possible with the ticker tape type display. Thus, it would be advantageous to have an improved method and apparatus for displaying dynamic information.

SUMMARY OF THE INVENTION

The present invention provides a method and apparatus in a data processing system for displaying data. A stream of data is received. The stream of data is displayed in a scrolling display field in which data is scrolling. Responsive to a user input selecting a portion of the data in the stream of data being displayed, scrolling of the data is halted in the scrolling display field. A stationary display field is created. Scrolling of the data on the scrolling display field is restored. Responsive to changes in the selected data in the stream of data being received, the scrolling display field and the stationary display field are updated.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
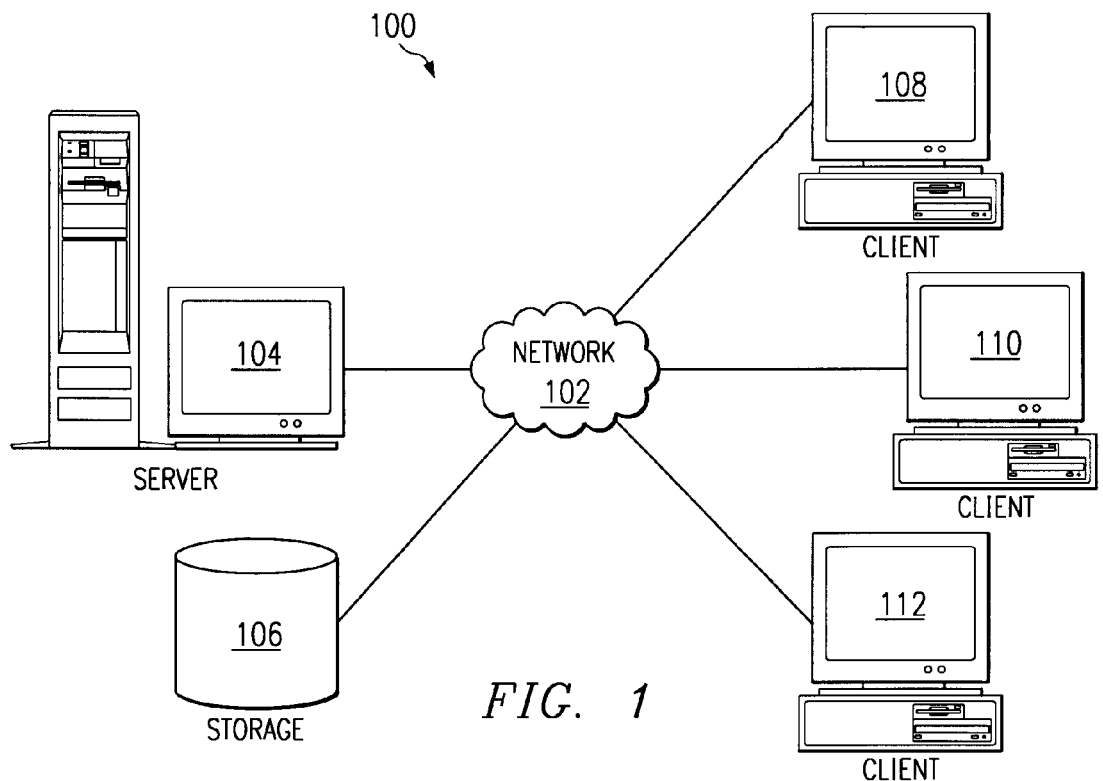
FIG. 1 depicts a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Server 104 may send a data stream containing dynamic data to clients 108, 110, and 112.

Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
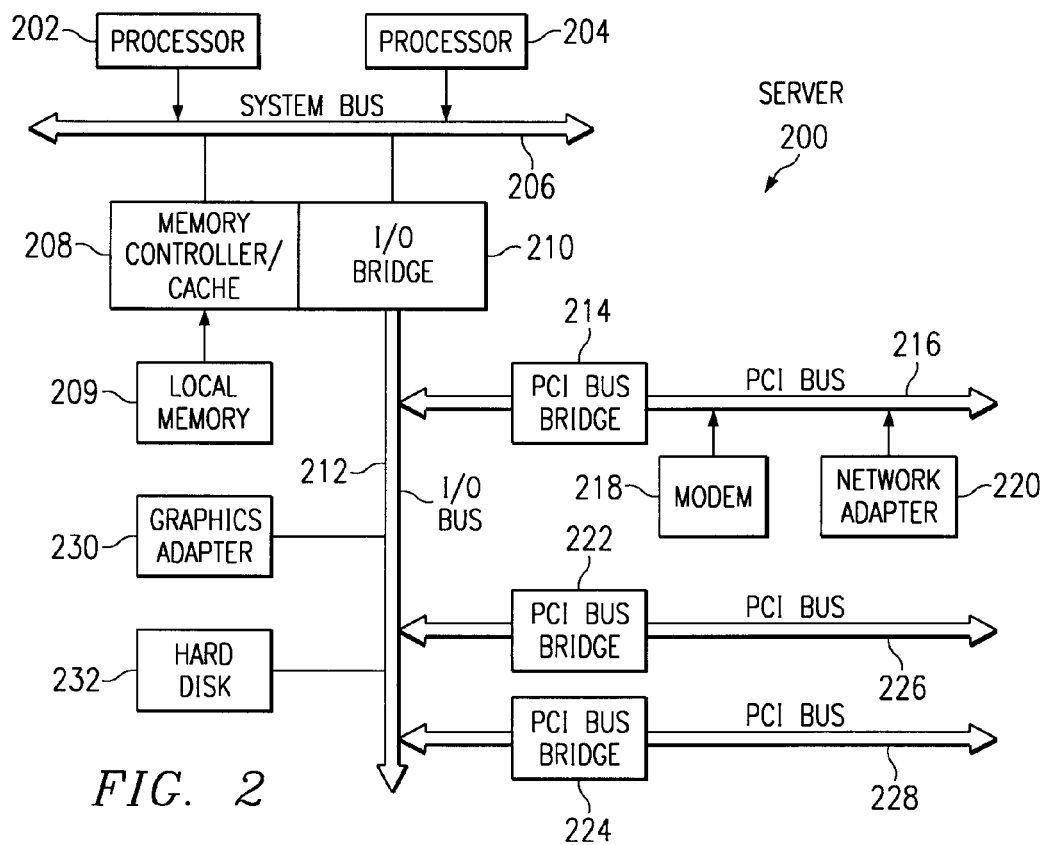
FIG. 2 is a block diagram of a data processing system, which may be implemented as a server in accordance with a preferred embodiment of the present invention.

Referring to FIG. 2, a block diagram depicts a data processing system, which may be implemented as a server, such as server 104 in FIG. 1, in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218–220 may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
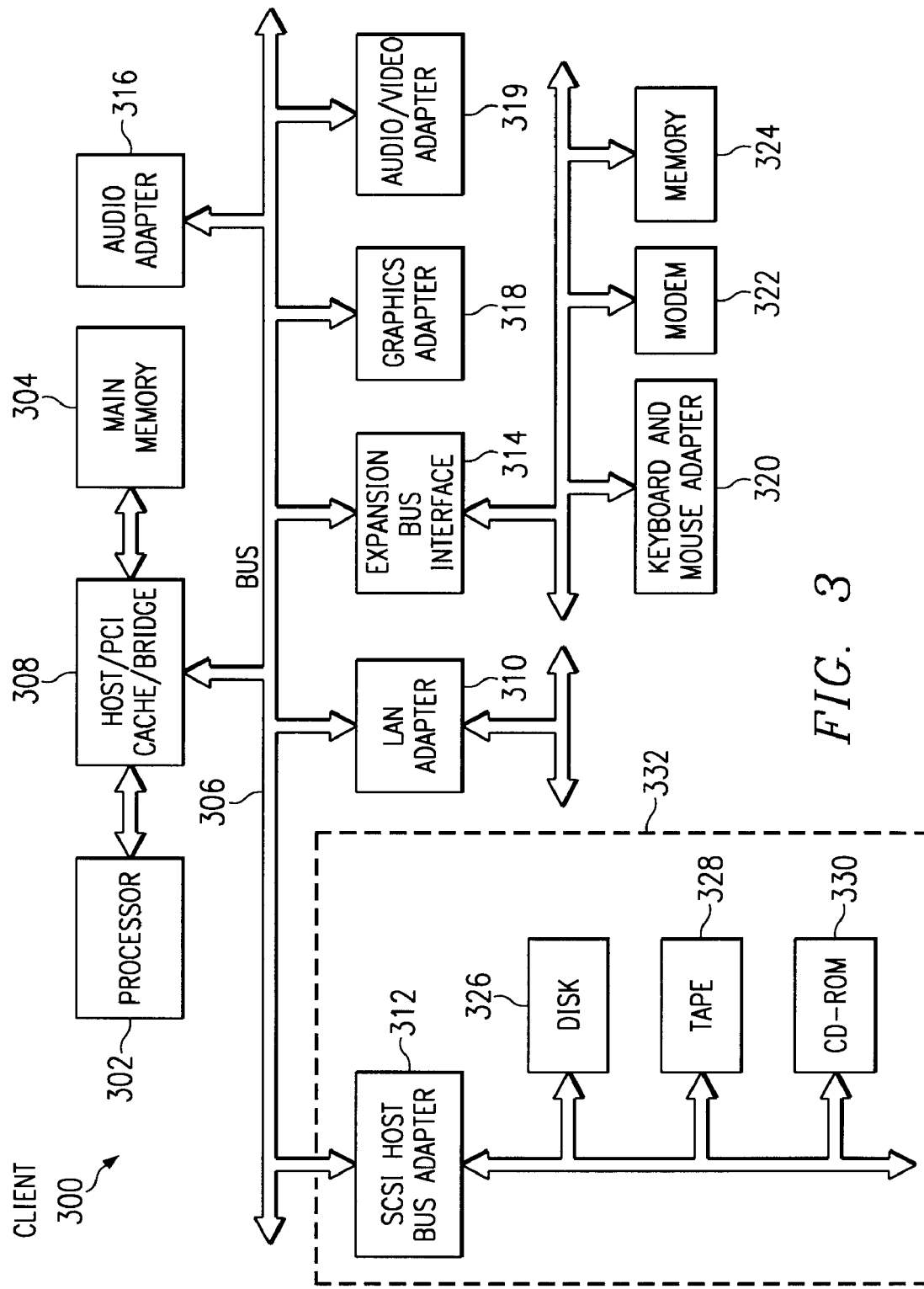
FIG. 3 is a block diagram illustrating a data processing system in which the present invention may be implemented.

With reference now to FIG. 3, a block diagram illustrates a data processing system in which the present invention may be implemented. Data processing system 300 is an example of a client computer. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of International Business Machines Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide non-volatile memory for storing operating system files and/or user-generated data. Alternatively, data processing system 300 may be implemented as a notebook or palm top computer.

The depicted example in FIG. 3 and above-described examples are not meant to imply architectural limitations.

The present invention provides a method, apparatus and instructions for presenting dynamic data. The resent invention allows for a user to view dynamic data on a display and allows the user to select portions of the dynamic data to be anchored to a portion of the screen such that the user may view information being scrolled across a display field, also referred to as a scrolling display field, and view information anchored to a portion of the screen, also referred to as a static display field. The information in the static field is updated along with the information in the scrolling display field.

Figure 4:
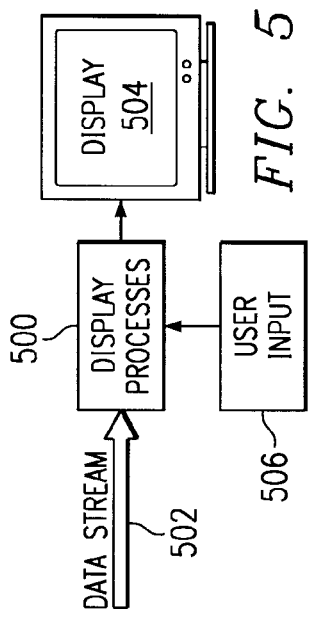
FIG. 4 is a diagram illustrating presentation of dynamic data in accordance with a preferred embodiment of the present invention.

With reference next to FIG. 4, a diagram illustrating presentation of dynamic data is depicted in accordance with a preferred embodiment of the present invention. Display screen 400 includes a scrolling display field 402 in which dynamic data points 404 and 406 are displayed. In this example, scrolling display field 402 is displayed as a dynamic ticker tape in which the latest information is displayed to the user for all data points, such as stock quotes, selected for monitoring by the user. In this example, information scrolls from the right to the left and contains updated values for the data points as they are available through a selected source of data, such as an Internet connection to a brokerage firm.

A user may anchor data within other portions of display 400, such as area 408. For example, static data points are displayed within static display fields 410, 412, and 414 within area 408 of display 400. These static display fields may be created by selecting a portion of scrolling display field 402 using a pointing device, such as stylus 416. Selection of scrolling display field 402 would result in a halting of the scrolling to prevent different data from being scrolled under stylus 416. The user then could drag a selected item, such as dynamic display point 404, to a different portion of display 400. Alternatively, the user could tap on a portion of the display area, such as area 408 and have the selected data point appear within a static display field. Thereafter, scrolling data field 402 would resume scrolling after the anchor point is established.

These items could be deleted at a later time by selecting the particular item twice in a quick successive fashion with stylus 416. At that time, the static display field would be removed, but the data point would still be displayed within scrolling display field 402.

Figure 5:
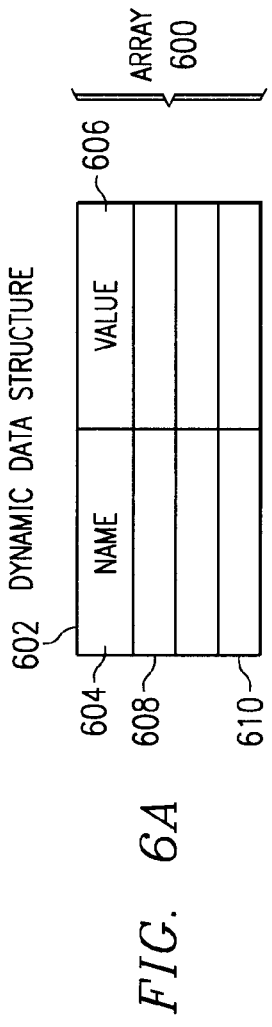
FIG. 5 is a block diagram of components used to display data in accordance with a preferred embodiment of the present invention.

Turning next to FIG. 5, a block diagram of components used to display data is depicted in accordance with a preferred embodiment of the present invention. In this example, display processes 500 receive a data stream 502 and displays information from data stream 502 on display 504. In this example, a display thread is used to display data on display 504 and a data input thread is used to receive data stream 502. The data stream may be displayed in the form of information that is scrolled across display 504. The information scrolled across display 504 is updated as updated or changed information is received in data stream 502 by display processes 500. In addition, user input 506 may cause display processes 500 to anchor data to display 504 in which the data is continuously updated in response to changes to the data being received in data stream 502. A user input thread is employed to receive user input 506.

Figure 6A:
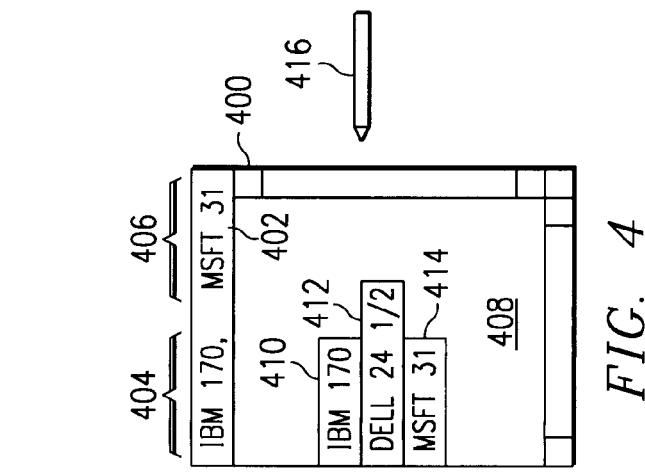
FIGS. 6A and 6B are arrays of data structures used to store and process data in accordance with a preferred embodiment of the present invention.
Figure 6B:
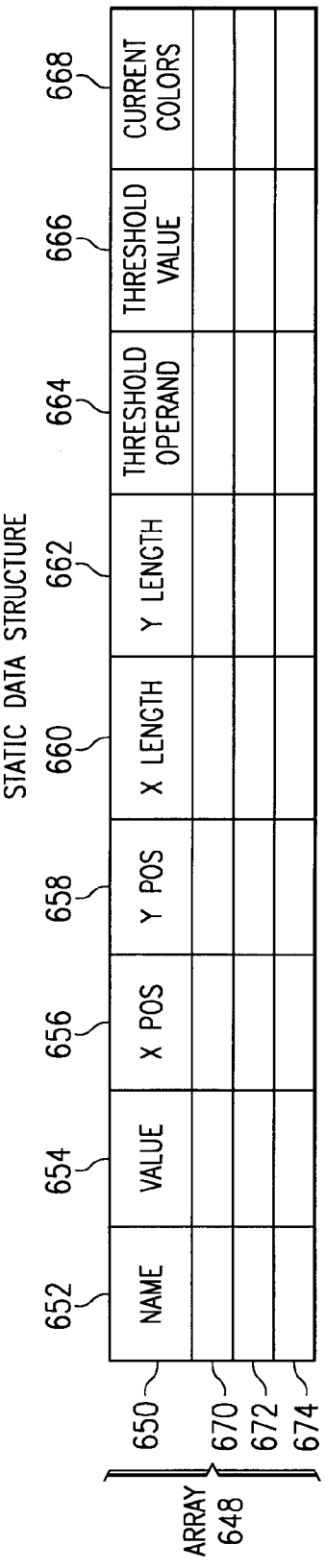

With reference next to FIGS. 6A and 6B, arrays of data structures used to store and process data are depicted in accordance with a preferred embodiment of the present invention. In FIG. 6A, an array 600 containing dynamic data elements is illustrated. Dynamic data element 602 includes a name 604 and a value 606. Dynamic data element 608 and 610 along with dynamic data element 602 form a dynamic data array in which the name is considered a unique identifier. The names and values in the array are shown in the scrolling display field. For example, the name may be the symbol for a company while the value is a value of one share of stock in the company.

In FIG. 6B, an array 648 is illustrated containing static data elements in which static data element 650 includes the following values: name 652, value 654, X-position 656, Y-position 658, X-length 660, Y-length 662, threshold operand 664, threshold value 666, and current color 668. Static data element 650 along with static data elements 670–674 form a static data array in which name 652 is a unique identifier. X-position 656 and Y-position 658 indicate the location of the static display field in the display while X-length 660 and Y-length 662 define the area of the static display field in the display. Threshold operand 664 and threshold value 666 are employed to determine if the information displayed within the static display field should be changed to provide a visual cue. Threshold operand 664 is the comparison symbol used to determine if value 654 has reached a threshold by comparing the current value to defined threshold value 666. For example, the display may be in a highlighted or un-highlighted color with the un-highlighted color being the default display. Alternatively, the color or font used may be changed.

The elements in the array illustrated in FIGS. 6A and 6B are updated as new data is received. Although the data structures are shown in the form of arrays, other types of data structures may be implemented, such as, for example, linked lists.

Figure 7:
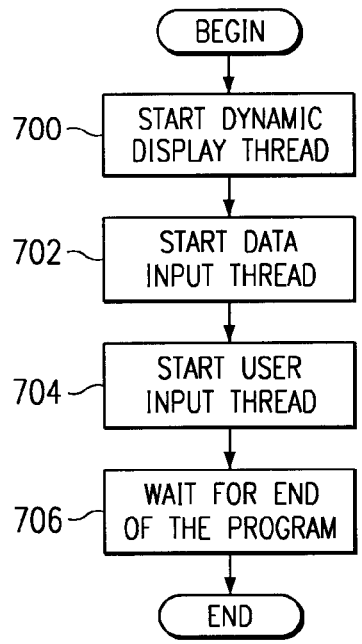
FIG. 7 is a high level flowchart of a process used to display dynamic data in accordance with a preferred embodiment of the present invention.

Turning now to FIG. 7, a high level flowchart of a process used to display dynamic data is depicted in accordance with a preferred embodiment of the present invention. The process begins with the starting of a dynamic display thread (step 700). Next, a data input thread is started (step 702), and a user input thread is started (step 704). The process then waits for the program to end (step 706) with the process terminating after the program ends.

Figure 8:
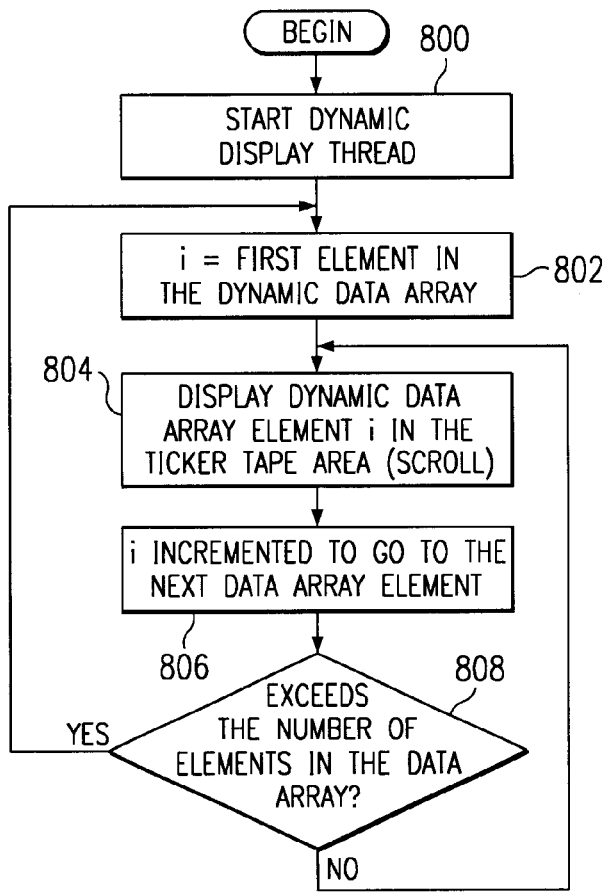
FIG. 8 is a flowchart of a process used by a dynamic display thread in accordance with a preferred embodiment of the present invention.

With reference to FIG. 8, a flowchart of a process used by a dynamic display thread is depicted in accordance with a preferred embodiment of the present invention. The process begins with the starting of the dynamic display thread (step 800). A counter i is then set to the first element in a dynamic data array (step 802). Next, dynamic data array element i is displayed in the scrolling display field (step 804). Next, the counter i is incremented to the next data array element (step 806). A determination is then made as to whether the counter i has been incremented beyond the last element in the dynamic data array (step 808). If the counter i has been incremented past the last element, the process returns to step 802. Otherwise, the process will return to step 804 to display the element.

Figure 9:
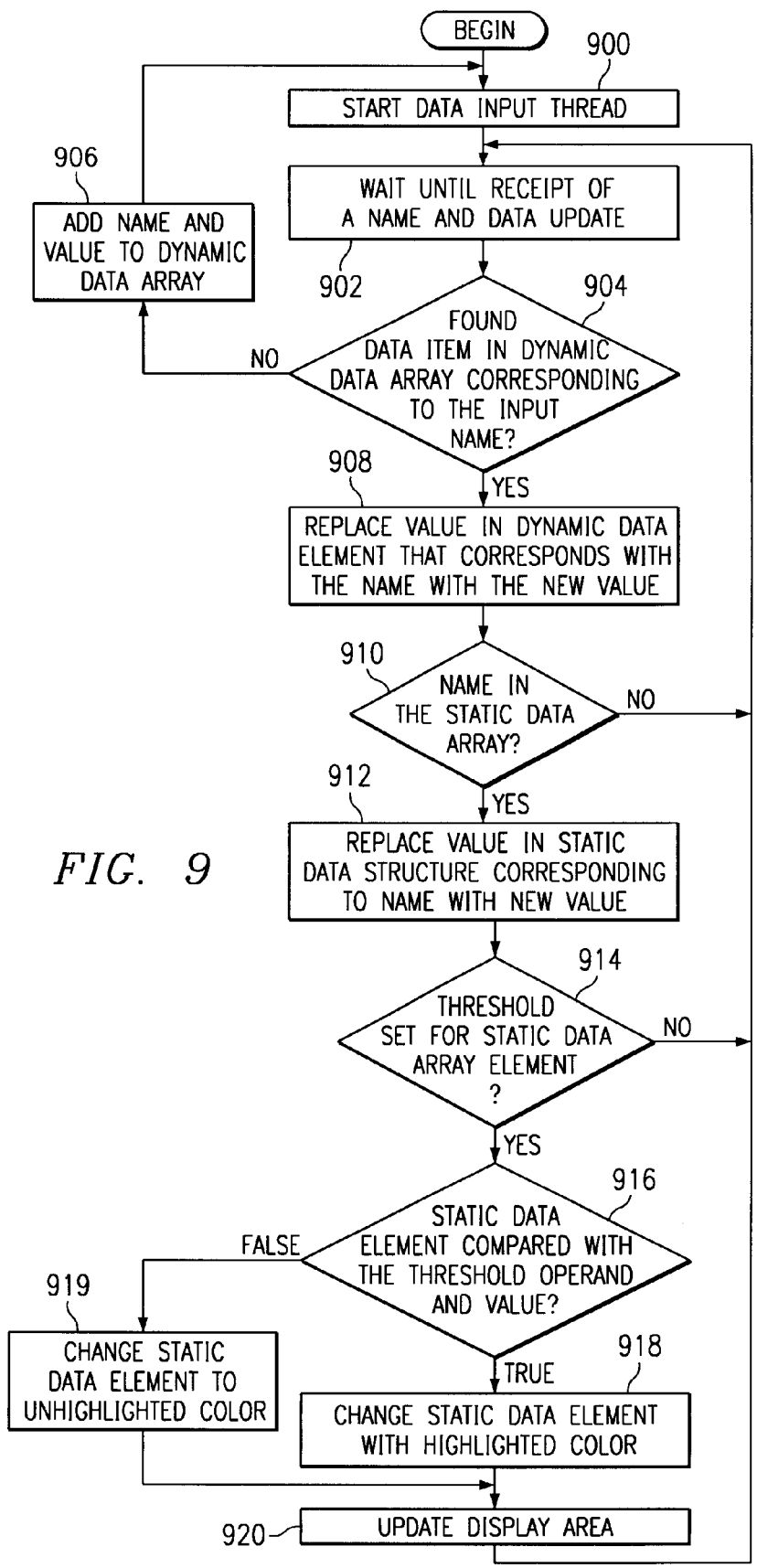
FIG. 9 is a flowchart of a process employed by a data input thread in accordance with a preferred embodiment of the present invention.

With reference next to FIG. 9, a flowchart of a process employed by a data input thread is depicted in accordance with a preferred embodiment of the present invention. The process begins with the starting of the data input thread (step 900). Next, the process waits for the receipt of a name and data update (step 902). Upon receiving a name and data update, a determination is made as to whether a data item is present in the dynamic data array corresponding to the received name in the update (step 904). If a data item is not present, a new data structure is created using the received name and value and added to the dynamic data array (step 906) with the process then returning to step 902.

Otherwise, the corresponding value for the name in the dynamic data element is replaced with the new value (step 908). This data structure is the one corresponding with the received name. Thereafter, a determination is made as to whether the name is found in the static data array (step 910). If the name is not found, the process returns to step 902. Otherwise, the static data element corresponding to the received name has its value replaced with the new received value (step 912). Then, a determination is made as to whether a threshold has been set for the static data element (step 914). If a threshold has not been set, the process returns to step 902. The presence of a threshold being set results in a comparison of the static data element with the threshold operand and value (step 916). For example, the boolean operator could be represented in the equation: current value (boolean operator) threshold value. If the user wanted to determine if a stock price has exceeded 30, the threshold operand would be ">" and the threshold value would be 30. If the result of this comparison is true, the color value is changed to a highlighted color value (step 918). Thereafter, the display area is updated (step 920) with the process returning to step 902.

With reference again to step 916, if the result of this comparison is false, the static data element has its color value changed to an un-highlighted color value (step 919) with the process proceeding to step 920. Although in the depicted example, this change in color value is between a highlighted to an un-highlighted value, other visual cues may be used, such as change in font or size of the font.

With reference now to FIG. 10, a flowchart of a process employed by a user input thread is depicted in accordance with a preferred embodiment of the present invention. The process begins by the starting of the user input thread (step 1000). The process then waits for user input (step 1002). When a user input is received, a determination is made as to whether the user has selected an item from the scrolling display field (step 1004). In this example, the scrolling display field is in the form of a ticker tape pane. If the user has selected an item from the scrolling display field, the dynamic display thread is halted to stop scrolling within the scrolling display field (step 1006). Next, a name and value is retrieved for the selected item (step 1008). A determination is then made as to whether the user has released the selected item (step 1010). If the user has not released the selected item, the process returns to step 1010.

Otherwise, a determination is made as to whether the scrolling display field is present under the item when the user releases the item (step 1012). If the answer to this determination is yes, the process returns to step 1002. This determination is used to identify when a user does not actually drag an item off the scrolling display field prior to releasing the item. If the answer to this determination is no, then a determination is made as to whether the user has released the selected item over a static display field (step 1014). If the user has released the element over a static display field, old static data presently being displayed in the static display field is removed from the display and the static data element (step 1016).

Next, the data selected by the user is then placed on the display. This is accomplished by creating a static data element and adding the static data element to the static display array using the information from the selected item (step 1018). Step 1018 includes placing the name and value of the selected information into the static data element and placing the x-position, y-position, x length, and y length information for a static display field to display the name and value information.

With reference again to step 1014, if the user has released the element over an area of display other than a static display field, then the process proceeds to step 1018 as described above.

The display is then updated (step 1020). Thereafter, the display thread is restarted (step 1022) with the process then returning to step 1002. This step restarts scrolling of the information on the display.

With reference again to step 1004, if the user has not selected an item from the scrolling display field, the process then determines whether the user has selected a static display field in the display area for deletion (step 1024). The indication of the deletion may be made by a double selection of the static display field using a pointing device, such as a stylus. If the user has selected a static display field, the static display field is removed from the display area (step 1026), and the static data element is removed from the static data array (step 1028). Thereafter, the display area is updated (step 1030) with the process then returning to step 1002.

Turning back to step 1024, if the user has not selected a static display field for deletion, a determination is made as to whether the user has selected a static display field to set a threshold (step 1032). If the user has selected a static display field to set a threshold, the process then receives the threshold operand and the threshold value (step 1034). The threshold operand may include symbols, such as, for example, >, =, or contains "word". The threshold value in this example may be in the form of a number or a string, depending on the dynamic data type. Upon receiving the threshold operand and the threshold value, these values are added to the static data element associated with the static display field (step 1036). Next, the static data element is compared to the threshold operand and threshold value (step 1038). If the result of this comparison is true, the process then changes the color value in the static data element to a highlighted color (step 1040). The display area is then updated (step 1042) with the process then returning to step 1002. With reference again to step 1038, if the result of this determination is false, the static data element has its color value changed to an un-highlighted color (step 1044) with the process then proceeding to step 1042 as described above. Of course, other types of changes may be made to the color value. Alternatively, a font size or font type may be used to indicate the result of the comparison between the data in the static data element and the threshold operand and the threshold value. This threshold may be used by the user to provide visual cues when certain thresholds are reached. For example, if a particular stock fell below 40, the stock may be displayed in red. Of course, different colors and shading may be used to provide additional visual cues to the user. In such an instance, additional thresholds and operands may be used in the static data elements in which these additional thresholds and operands may be compared to the information within the element. Also, the static data elements may include additional information other than name and value. For example, with stocks an indication of whether the value has gone up or down also may be included in the static data element.

With reference again to step 1032, if the user has not selected a static display field to set a threshold, a determination is then made as to whether the user has selected a static data element to remove the threshold (step 1046). If the user has decided to remove the threshold, the threshold operand and the threshold value are removed from the static data element (step 1048). The static data element has its color value changed to an un-highlighted color (step 1050). Thereafter, the display area is updated (step 1052) with the process then returning to step 1002.

With reference again to step 1046, if the user has not selected a static data element to remove the threshold, the process returns to step 1002. In this instance, it is assumed that the user has taken some unknown action.

Thus, the present invention provides an improved method and apparatus for displaying changing data on a display. This advantage is provided through an ability to select data from a scrolling or moving display field and place it in a non-moving or static display field for display. The data in the static display field is updated as the data changes for the particular selection.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The present invention is not limited to a stock ticker example. The processes of the present invention may be applied to other domains in which a need to view a customizable set of dynamic data and a need to easily change the set of dynamic data is present. Further, the processes could be applied to measuring variables, such as water flow from irrigation canals. In such a case, water flow rates and silt density could be transmitted from each canal lock through a wireless Internet connection and captured in a computer, such as a palm top computer. A user located in the field could dynamically view the data, individually monitor selected data points, make physical adjustments to different canal locks, and view the impact of the changes in the field.

The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for displaying data, the method comprising the data processing system implemented steps of:

receiving a stream of data;

displaying the stream of data in a scrolling display field in which data is scrolling;

responsive to a user input selecting a portion of the data in the stream of data being displayed, halting scrolling of the data in the scrolling display field;

creating a stationary display field;

restoring scrolling of the data in the scrolling display field; and responsive to changes in the previously selected data in the stream of data being received, updating the scrolling display field and the stationary display field.

2. The method of claim 1 further comprising:

monitoring the stream of data for specified changes in the selected data; and responsive to detecting the specified changes, changing the display of the stationary field.

3. The method of claim 1, wherein the computer system is a hand held device having a limited display.

4. The method of claim 3, wherein the computer system is a personal digital assistant.

5. The method of claim 3, wherein the data processing system is a palm top computer.

6. A method in a data processing system for displaying data, the method comprising:

receiving a data stream containing data for display;

displaying the data in the data stream in a first display, wherein the data being displayed within the first display is scrolled;

monitoring for a user input selecting a portion of the data being displayed to form a selected portion of the data;

responsive to receiving the user input, displaying the selected portion of the data in a second display, wherein the selected portion of the data being displayed within the second display is stationary;

monitoring for changes in the selected portion of data as received by the data stream; and responsive to detecting a change in the selected portion of data, updating the second display to reflect the change in the selected portion of data.

7. The method of claim 6 further comprising:

responsive to the user input, halting scrolling of data within the first display until the second display is displayed.

8. The method of claim 7 further comprising:

responsive to changes in the data stream, updating the first display to reflect the changes in the data stream.

9. The method of claim 6, wherein the data processing system is a personal digital assistant.

10. The method of claim 6, wherein the data processing system is a palm top computer.

11. The method of claim 6, wherein a threshold is associated with the selected portion of the data and wherein the step of updating includes altering a display of the selected portion of data such that a visual cue is provided in addition to reflecting the change in the selected portion of data.

12. The method of claim 11, wherein the selected portion of data is displayed using a first color and wherein the visual cue includes displaying the selected portion of data using a second color.

13. The method of claim 11, wherein the selected portion of data is displayed using a first font and wherein the visual cue includes displaying the selected portion of data using a second font.

14. A data processing system for displaying data, the data processing system comprising:
   receiving means for receiving a stream of data;
   displaying means for displaying the stream of data in a scrolling display field in which data is scrolling;
   halting means, responsive to a user input selecting a portion of the data in the stream of data being displayed, for halting scrolling of the data in the scrolling display field;
   creating means for creating a stationary display field;
   restoring means for restoring scrolling of the data in the scrolling display field; and
   updating means, responsive to changes in the previously selected data in the stream of data being received, for updating the scrolling display field and the stationary display field.

15. The data processing system of claim 14 further comprising:
   monitoring means for monitoring the stream of data for specified changes in the selected data; and
   changing means, responsive to detecting the specified changes, for changing the display of the stationary field.

16. The data processing system of claim 14, wherein the computer system is a hand held device having a limited display.

17. The data processing system of claim 16, wherein the computer system is a personal digital assistant.

18. The data processing system of claim 16, wherein the data processing system is a palm top computer.

19. A data processing system for displaying data, the data processing system comprising:
   receiving means for receiving a data stream containing data for display;
   first displaying means for displaying the data in the data stream in a first display, wherein the data being displayed within the first display is scrolled;
   first monitoring means for monitoring for a user input selecting a portion of the data being displayed to form a selected portion of the data;
   second displaying means, responsive to receiving the user input, for displaying the selected portion of the data in a second display, wherein the selected portion of the data being displayed within the second display is stationary;
   second monitoring means for monitoring for changes in the selected portion of data as received by the data stream; and
   updating means, responsive to detecting a change in the selected portion of data, for updating the second display to reflect the change in the selected portion of data.

20. The data processing system of claim 19 further comprising:
   halting means, responsive to the user input, for halting scrolling of data within the first display until the second display is displayed.

21. The data processing system of claim 20 farther comprising:
   updating means, responsive to changes in the data stream, for updating the first display to reflect the changes in the data stream.

22. The data processing system of claim 19, wherein the data processing system is a personal digital assistant.

23. The data processing system of claim 19, wherein the data processing system is a palm top computer.

24. The data processing system of claim 19, wherein a threshold is associated with the selected portion of the data and wherein the step of updating includes altering a display of the selected portion of data such that a visual cue is provided in addition to reflecting the change in the selected portion of data.

25. The data processing system of claim 24, wherein the selected portion of data is displayed using a first color and wherein the visual cue includes displaying the selected portion of data using a second color.

26. The data processing system of claim 24, wherein the selected portion of data is displayed using a first font and wherein the visual cue includes displaying the selected portion of data using a second font.

27. A computer program product in a computer readable medium for displaying data, the computer program product comprising:
   first instructions for receiving a stream of data;
   second instructions for displaying the stream of data in a scrolling display field in which data is scrolling;
   third instructions, responsive to a user input selecting a portion of the data in the stream of data being displayed, for halting scrolling of the data in the scrolling display field;
   fourth instructions for creating a stationary display field;
   fifth instructions for restoring scrolling of the data in the scrolling display field; and
   sixth instructions, responsive to changes in the previously selected data in the stream of data being received, for updating the scrolling display field and the stationary display field.

28. A computer program product in a computer readable medium for displaying data, the computer program product comprising:
   first instructions for receiving a data stream containing data for display;
   second instructions for displaying the data in the data stream in a first display, wherein the data being displayed within the first display is scrolled;
   third instructions for monitoring for a user input selecting a portion of the data being displayed to form a selected portion of the data;
   fourth instructions, responsive to receiving the user input, for displaying the selected portion of the data in a second display, wherein the selected portion of the data being displayed within the second display is stationary;
   fifth instructions for monitoring for changes in the selected portion of data as received by the data stream; and
   sixth instructions, responsive to detecting a change in the selected portion of data, for updating the second display to reflect the change in the selected portion of data.

* * * * *

UNITED STATES PATENT AND TRADEMARK OFFICE
CERTIFICATE OF CORRECTION

Figure 10A:
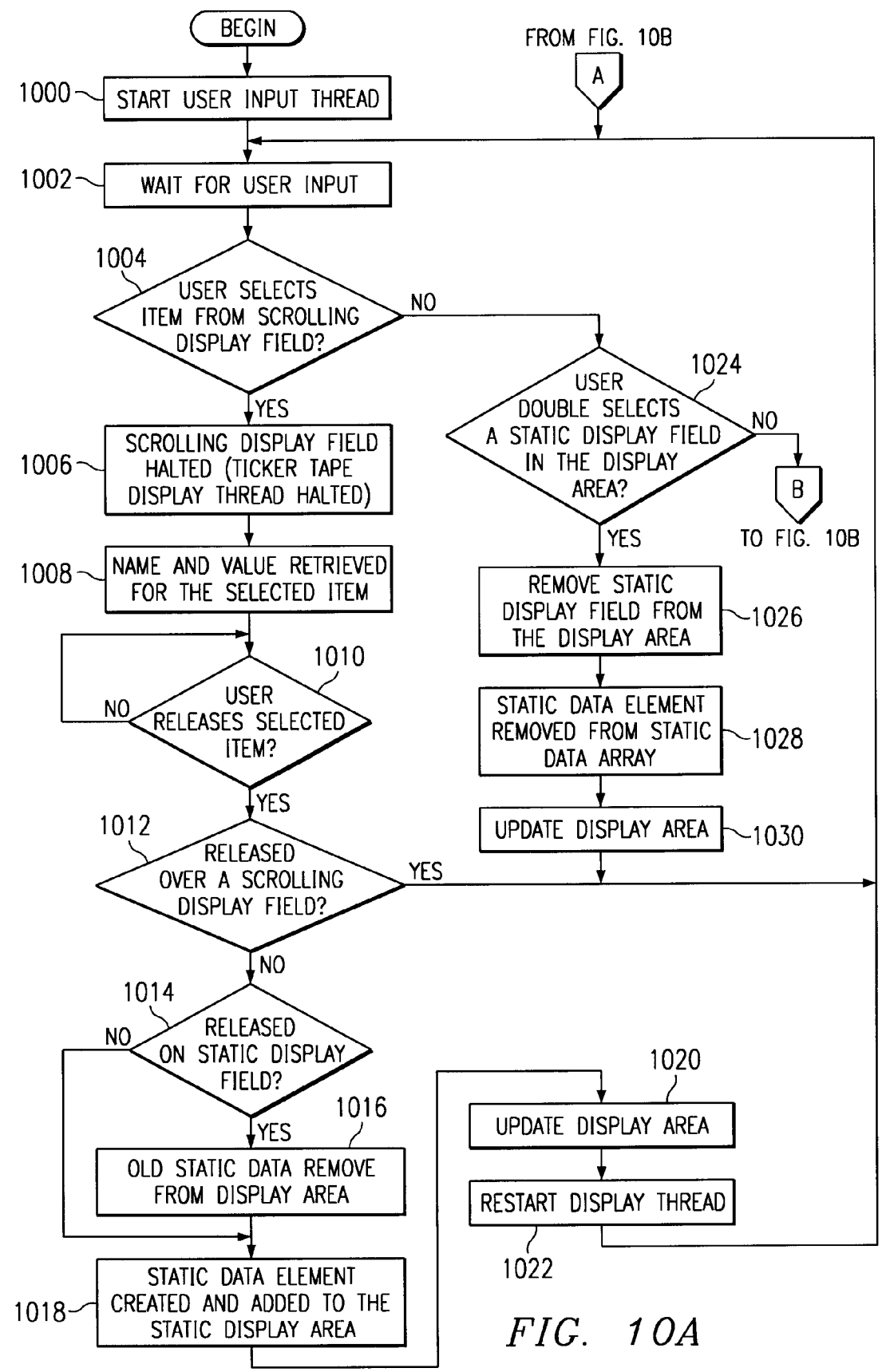
FIGS. 10A and 10B are flowchart of a process employed by a user input thread in accordance with a preferred embodiment of the present invention.
Figure 10B:
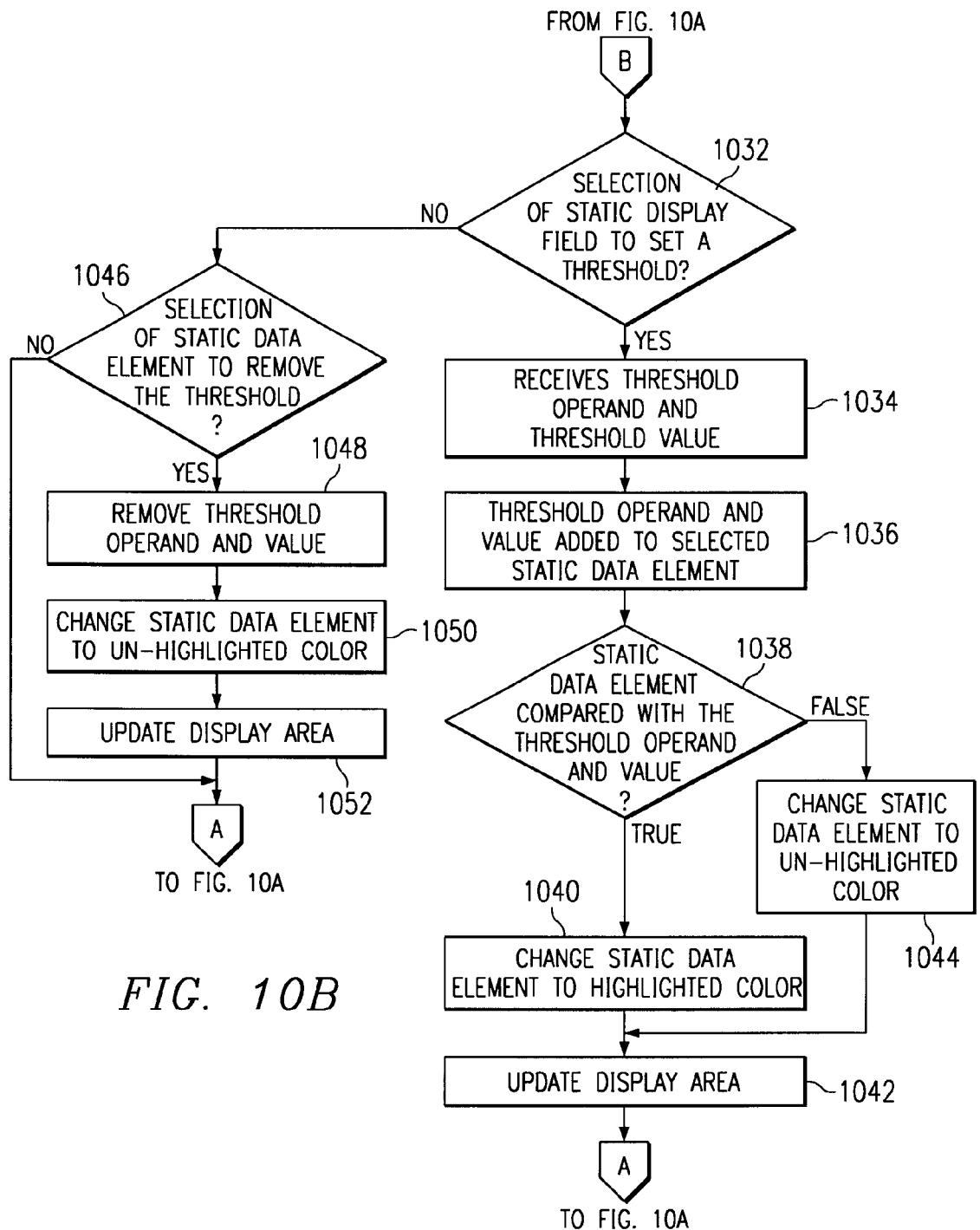

PATENT NO. : 6,870,551 B1 Page 1 of 1
APPLICATION NO. : 09/239248
DATED : March 22, 2005
INVENTOR(S) : Shrader It is certified that error appears in the above-identified patent and that said Letters Patent is hereby corrected as shown below:

Column 7,
Line 56, after "now to" delete "FIG. 10" and insert -- FIGS. 10A and 10B --.

Column 12,
Line 4, after "claim 20" delete "farther" and insert -- further --.

Signed and Sealed this

Eleventh Day of July, 2006

JON W. DUDAS
*Director of the United States Patent and Trademark Office*